United States Patent

Allen et al.

[15] 3,692,931

[45] Sept. 19, 1972

[54] TELEVISION IMAGE CONTROL CIRCUIT

[72] Inventors: John Kenneth Allen; Marvin Neil Norman, both of Indianapolis, Ind.

[73] Assignee: RCA Corporation, New York, N.Y.

[22] Filed: June 30, 1971

[21] Appl. No.: 158,451

[52] U.S. Cl. ..........................178/7.3 R, 178/DIG. 11

[51] Int. Cl. ..............................................H04n 5/14

[58] Field of Search .................178/DIG. 11, 7.3, 7.5; 328/217, 267; 325/492; 315/272; 307/103

[56] References Cited

UNITED STATES PATENTS

| | | | |
|---|---|---|---|
| 2,800,528 | 7/1957 | Beste | 178/7.5 R |
| 3,555,175 | 1/1971 | Griepentrog | 178/5.4 R |
| 3,375,436 | 3/1968 | Denton | 178/DIG. 11 |

*Primary Examiner*—Richard Murray
*Attorney*—Eugene M. Whitacre

[57] ABSTRACT

A voltage dependent resistor is coupled to sense the line voltage applied to a television receiver, and to respond to its variations in a manner to maintain substantially constant brightness and vertical height in the reproduced image when such changes occur.

6 Claims, 1 Drawing Figure

PATENTED SEP 19 1972 3,692,931
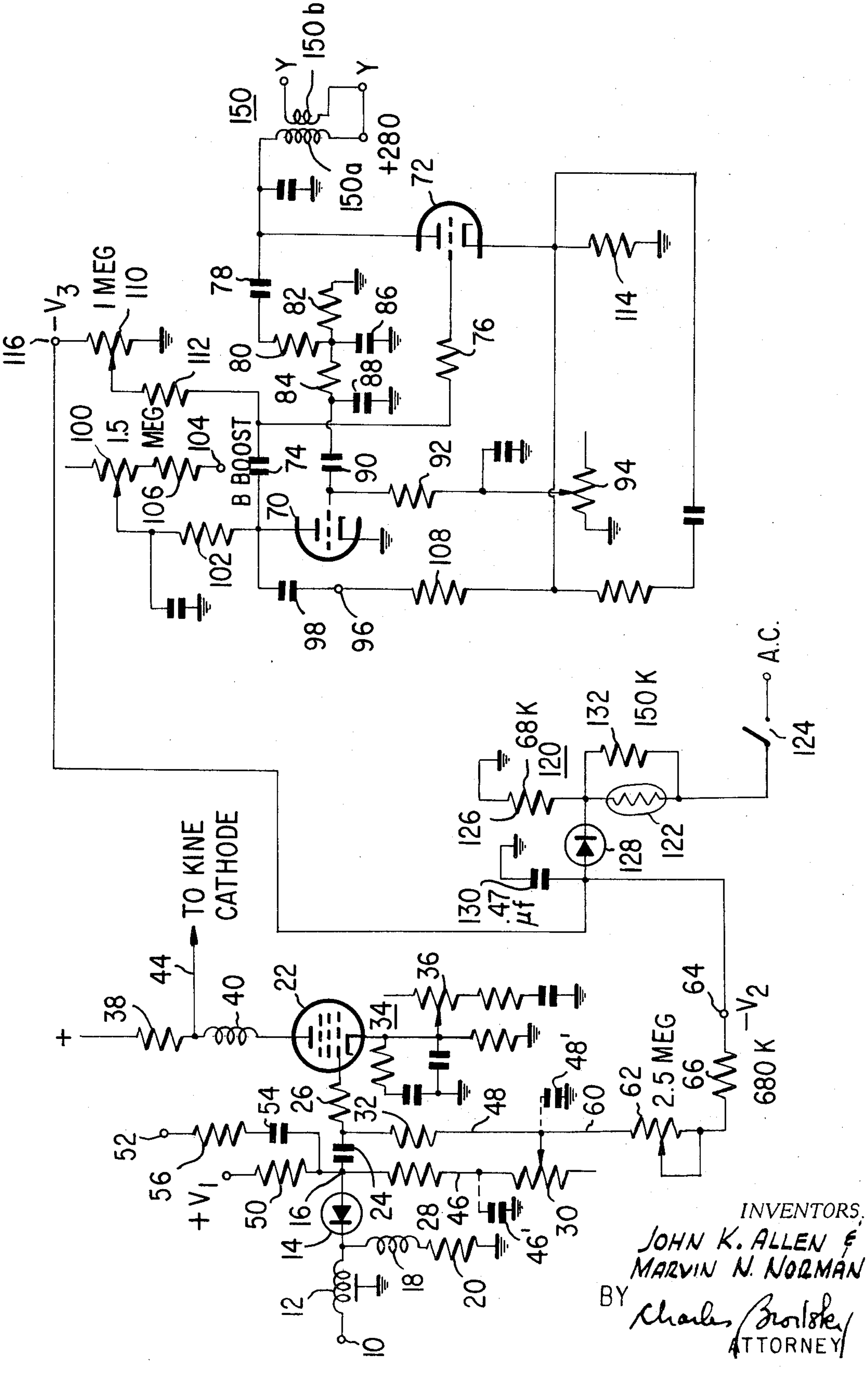
INVENTORS.
JOHN K. ALLEN &
MARVIN N. NORMAN
BY Charles Brodsky
ATTORNEY

TELEVISION IMAGE CONTROL CIRCUIT

1. Field of the Invention

This invention relates to improvements in brightness and vertical height control circuits for television receivers and, more particularly, to an arrangement for stabilizing the brightness and vertical height of a reproduced image in the presence of line voltage variations.

2. Summary of the Invention

As will become clear hereinafter, a preferred embodiment of the invention includes a voltage dependent resistor (VDR) serially coupled with a fixed resistor between a point of power line voltage and ground. A semiconductor rectifier and filter capacitor are serially coupled across the fixed resistor, in turn, to provide at their junction a direct voltage which varies in accordance with line voltage changes. The direct voltage provided by rectification and filtering is supplied to a brightness limiter potentiometer, on the one hand, to control the grid bias on a video output tube, and to a vertical height potentiometer on the other hand, to control the grid bias on a vertical output tube. Substantially constant picture brightness and vertical height will be seen to result for a range of power line voltages.

BRIEF DESCRIPTION OF THE DRAWING

These and other features of the invention will become clearer from a consideration of the following discussion taken in connection with the accompanying drawing which shows in schematic form a video amplifier circuit and a vertical deflection circuit in conjunction with which the illustrated VDR control arrangement of the present invention is particularly attractive.

DETAILED DESCRIPTION OF THE DRAWING

Although the present invention is appropriate for use in a monochrome television receiver, it is more likely to be used in a color unit, and it will therefore be described in connection with such a receiver. In the drawing, video signals having both alternating and direct current components are supplied from a video amplifier terminal 10 through a delay line 12 and a normally conducting blanking diode 14 to a junction point 16. A peaking coil 18 and a resistor 20 serially couple the junction of the components 12, 14 to ground, with the delay line 12 providing the required delay for the luminance signals and with the resistor 20 providing a terminating impedance for the line and a load impedance for the video amplifier. The alternating current components of the video signal are coupled from junction point 16 to the control grid of a pentode video output tube 22 via a capacitor 24 and a resistor 26. The direct current components of the video signal are coupled around the capacitor 24 by a decoupling resistor 28, a brightness control potentiometer 30 and another decoupling resistor 32.

The video output tube 22 has a contrast control circuit 34 connected to its cathode circuit, including a control potentiometer 36, an output load circuit for the anode of the tube 22 is comprised of a load resistor 38 and a peaking coil 40. The video signals which are developed across the load 38 may be direct current coupled to appropriate cathode electrodes of an image reproducing kinescope (not shown) by means of a lead 44.

Where the brightness control potentiometer 30 is to be mounted at a point on the cabinet of the receiver where it will be readily available to the viewer, its connection to the circuit may be made by way of leads 46, 48, respectively connecting one terminal of the resistive element of the potentiometer to the resistor 28 and the variable tap of the potentiometer to the resistor 32. capacitors 46', 48' respectively represent the distributed capacitance to ground of the leads 46, 48 and, also, any capacitance to ground which is inherent in the potentiometer 30 itself. Because the capacitance represented by these dotted capacitors 46' and 48' may be sufficiently large to provide a reactance for the video signal frequencies which is low with respect to the termination impedance 18, 20, the video signal might be severely attenuated if the decoupling resistor 28 is not used. The capacitance represented by capacitors 46', 48' also presents a low impedance with respect to the input impedance at control grid of the output tube 22 so that the video signal might be significantly attenuated if the decoupling resistor 32 were not used.

The blanking diode 14 is maintained in a conducting condition during the line scanning intervals of a television waveform by the connection of a resistor 50 between the junction point 16 and a source of positive potential $+V_1$. In order to prevent video signals from reaching the control grid of the output tube 22 during the line retrace intervals, negative blanking pulses from a source terminal 52 are applied to the anode of the diode 14 by means of a capacitor 54 and a resistor 56. If the blanking were to be accomplished by some other means, the junction of the peaking coil 18 and the delay line 12 would be directly connected to the junction 16 but, in either case, that junction will generally be at some positive potential.

The variable tap of the brightness control 30 is shown as being connected via a lead 60 to a brightness limiter potentiometer 62, coupled in turn to a source of negative direct voltage $-V_2$ at terminal 64 by a resistor 66. With the brightness control 30 set for minimum resistance and with the contrast control 36 set at midrange, the brightness limiter potentiometer 62 is adjusted until the positive direct voltage developed at the control grid of video output tube 22 by the divider action of resistors 28, 30, 62, 66 between the signal level input at the anode of the blanking diode 14 and the $-V_2$ terminal 64 is sufficient to cause a predetermined direct current flow (e.g. 240 milliamperes) to be measured in the cathode circuit of the receiver's horizOntal output tube, for example. After this setting of the potentiometer 62, further adjustment of the brightness control 30 will not cause such increase in the control grid voltage of video tube 22 as will result in an unstable brightness condition.

The vertical deflection circuit in conjunction with which the present invention is also operative includes a vertical oscillator stage 70 and a vertical output stage 72. The output terminals Y—Y of vertical stage 72 are coupled to appropriate deflection windings on the image reproducing kinescope in any appropriate manner.

As illustrated, the vertical oscillator 70 and vertical output stage 72 may be constructed by utilizing the two sections of a double triode, such as RCA Type 13GF7. As is customary in circuits of this type, the oscillator section 70 produces a substantially sawtooth voltage waveform which is coupled by means of a capacitor 74 and a resistor 76 to the control grid of the output section 72. Oscillations are maintained in the circuit by a positive feedback from the anode of section 72 to the control grid of oscillator 70 via a pulse shaping network comprising capacitor 78, resistors 80, 82 and 84, capacitors 86, 88 and 90, and resistors 92 and 94. Resistor 94 is shown variable, to serve as a vertical "hold" control which is adjustable to permit the setting of the frequency of oscillation at a desired value.

After initial adjustment of resistor 94, the frequency of oscillation is maintained by means of vertical synchronizing pulses supplied at terminal 96 and coupled to the control grid of output section 72 via capacitors 98 and 74 and resistor 76. The amplitude of the sawtooth drive voltage supplied by oscillator section 70 may be adjusted by means of a variable resistor 100 having an adjustable tap serially coupled by a resistor 102 to the anode of oscillator 70, with the drive voltage being further dependent upon the anode supply voltage provided through the control 100 from a "B boost" terminal 104 of the receiver's horizontal deflection circuit by means of a resistor 106. The shape of the sawtooth drive waveform supplied by the oscillator 70 is dependent upon the values chosen for capacitor 98 and resistor 108, together with the values of resistors 100, 102 and 106.

As will readily be appreciated, the shape and amplitude of the anode current produced in output secton 72 are dependent upon the shape and amplitude of the sawtooth drive voltage supplied by oscillator section 70 (controllable as explained above) and, furthermore, are dependent upon the operating conditions and characteristics of the particular discharge device utilized in output section 72. The operating conditions, (i.e. control grid-to-cathode bias) maY be adjusted by means of a variable height control resistor 110 coupled in series with a fixed resistor 112 in the control grid circuit of output section 72, the cathode circuit including a resistor 114 being returned to ground. The operating conditions of section 72 will be seen to be further dependent upon the magnitude of a negative grid control voltage $-V_3$ provided at the terminal 116 coupled to the resistor 110.

The anode of output section 72 is coupled to a positive voltage supply (+280 v.) by means of the primary winding **150*a* of an output transformer 150. The anode current variations which are produced in output section 72 as a result of the sawtooth drive voltage applied to the control grid thereof flow through the primary winding 150*a* to produce in secondary winding 150*b*** the required sawtooth deflection current waveform for application to the vertical deflection winding on the kinescope via the terminals Y—Y.

The negative direct voltage provided at the $-V_2$ terminal 64 for the brightness control circuit and at the $-V_3$ terminal 116 for the vertical height control circuit are derived in accordance with the present invention from a compensating circuit, indicated generally by the reference numeral 120, which is responsive to power line variations. As shown in the drawing, this compensating arrangement 120 includes a voltage dependent resistor 122 coupled in series with the ON/OFF switch of the television receiver 124 to sense the applied line voltage, and a fixed resistor 126 coupling the voltage dependent device to ground. A semicondutor rectifier 128 has its cathode coupled to the junction of resistors 122, 126 and its anode coupled to ground via a filter capacitor 130. A resistor 132 is coupled across the dependent device 122 to lessen the effect of the negative temperature coefficient exhibited by this component. As is also shown, the anode of rectifier 128 is coupled to the $-V_2$ voltage terminal 64 associated with the brightness control 30 and to the $-V_3$ voltage terminal 116 associated with the vertical height control 110. Such a compensating circuit is more fully illustrated together with its associated components in the publication of the RCA Sales Corporation, under its file designation 1971 No. T3 describing its CTC 55 color television receiver.

In operation, the compensating circuit 120 will be seen to provide a negative direct voltage at the junction of rectifier 128 and capacitor 130. This voltage will vary in accordance with changes in the power line voltage in a manner to become more negative as the line voltage increases from a nominal 120 volt value and to become less negative as the applied line voltage decreases in value. Increases in line voltage which tend to increase the positive excursion of the input signal at diode 14—thus tending to increase the conduction of the video output tube 22, thereby reducing the direct voltage component of the signal applied to the cathode electrodes of the picture tube kinescope and increasing reproduced brightness—, however, will be offset by the increasing negative direct voltage applied as the compensating $-V_2$ bias to the brightness limiter potentiometer 62 by way of the terminal 64 connected to the junction of rectifier 128 and capacitor 130. Similarly, decreases in line voltage which tend to decrease the positive excursion of the input signal—thereby decreasing the video output tube conduction and the resulting reproduced brightness—are likewise offset by the less negative compensating $-V_2$ bias voltage applied to the brightness limiter 62 through its associated terminal 64.

In corresponding manner, variations in the power line voltage serve to vary the "B boost" voltage provided as the anode supply for the oscillator section 70 by means of resistors 106, 100,and 102 serially coupled in that order. The variations in the amplitude of the sawtooth drive voltage supplied as a result are compensatingly offset, however, by the oppositely varying bias applied to the control grid of the output section 72 by virtue of the changing negative direct voltage coupled to the height control terminal 116 from rectifier 128 and capacitor 130, as reflected through it and the resistors 112 and 76. Here, also, any line voltage change in a direction to change the "B boost" voltage to increase or decrease drive amplitude (and, consequently, the vertical height of a reproduced picture) is offset by virtue of the increasing or decreasing negative direct voltage applied to the control grid of the output section 72 by virtue of the coupling from the compensating circuit 120 to the terminal 116. It will be apparent that the changing negative voltage coupled to the grid of section 72 similarly offsets the tendency for the vertical height to vary in response to increases or decreases in the +280 280 volt B+ voltage applied to the anode of output section 72.

In actual practice, it has been observed that a substantially constant brightness and vertical height characteristic will be maintained in the reproduced image when the change in negative direct voltage applied to the brightness control circuit and to the vertical height control circuit varies in greater proportion than the variations in line voltage which initiate such change. For that reason, a voltage dependent device—such as VDR 122—is employed in the coupling circuit for the applied line voltage, rather than a fixed resistor. With a device having a negative voltage coefficient, the resistive voltage divider formed by the dependent device 122 and the fixed resistor 126 serves to produce a negative direct voltage at the junction of rectifier 128 and capacitor 130 which changes proportionally greater than the line voltage variation. With the values for the components of the compensating circuit as shown in the drawing—and with a voltage dependent resistor selected to produce a 110 volt drop at 1 milliampere current and with a characteristic such that the ratio of voltage through the dependent unit at one milliampere to the voltage at one tenth milliampere equals 1.6—the extent of variations in the negative direct voltage developed at the junction of rectifier 128 and capacitor 130 for application to the brightness limiter circuit terminal 64 as a function of line voltage was observed as noted below. Such observations were made with the brightness limiter 62 set for a kinescope current of 800 microamperes at 120 volts line voltage.

TABLE 1

| Line Voltage | Brt Lim Voltage |
|---|---|
| 105.0 $V_{AC}$ | −29.1 $V_{DC}$ |
| 107.5 | −33.1 |
| 110.0 | −36.0 |
| 112.5 | −39.4 |
| 115.0 | −43.0 |
| 117.5 | −45.8 |
| 120.0 | −48.8 |
| 122.5 | −52.0 |
| 125.0 | −54.1 |
| 127.5 | −56.1 |
| 130.0 | −58.0 |
| 132.5 | −59.8 |

A similar table of observations is shown below as maintaining substantially constant height in the reproduced picture as the line voltage varies, for a kinescope beam current of 200 microamperes. In this table, the grid voltage indicated represents that direct voltage developed by the compensating circuit 120 and applied via resistors 110, 112 and 76 to the output oscillator section 72.

TABLE 2

| Line Voltage | Grid Voltage |
|---|---|
| 105.0 $V_{AC}$ | −22.3 $V_{DC}$ |
| 107.5 | −24.1 |
| 110.0 | −25.6 |
| 112.5 | −27.2 |
| 115.0 | −28.8 |
| 117.5 | −30.3 |
| 120.0 | −31.9 |
| 122.5 | −33.3 |
| 125.0 | −34.8 |
| 127.5 | −36.2 |
| 130.0 | −37.5 |
| 132.5 | −39.0 |

While there has been described what is considered to be a preferred embodiment of the present invention, it will be readily apparent that other modifications may be made by those skilled in the art. Therefore, it is intended that the claims appended hereto be read in light of the spirit and scope of the teachings of this specification.

What is claimed is:

1. In a television receiver having a cathode ray picture tube, deflection means for providing a vertical scanning waveform to develop a reproduced image, and brightness control means for varying the average illumination of said image on the screen of said tube, and wherein said deflection means and said brightness control means have a tendency to undesirably vary the amplitude of said scanning waveform and the average illumination of said image, respectively, in the presence of variations in an applied power line voltage, the combination therewith of:

first means responsive to said line voltage variations to provide first and second control signals representative thereof;

second means coupling said first control signal to said deflection means to compensatingly vary an operating characteristic thereof in a manner to offset said undesirable tendency to vary said scanning waveform amplitude with power line variations; and third means coupling said second control signal to said brightness control means to additionally and compensatingly vary one of its operating characteristics to offset said undesirable tendency to vary said average image illumination with said line voltage variations;

said first means providing said first and second control signals of a variable magnitude which changes by a proportionally greater amount than the variation in line voltage initiating such change to maintain substantially constant vertical deflection and beam current flow in said picture tube.

2. The combination of claim 1 for use in a television receiver of the type including a vertical oscillator circuit and a vertical output amplifier within said deflection means for developing said vertical scanning waveform and in which the amplitude of said oscillator signal exhibits said tendency to undesirably vary the amplitude of said scanning waveform in the presence of said power line variations, wherein said second means couples said first control signal to vary an operating bias on said vertical output amplifier to offset the attempt of said increased amplitude oscillator signal to vary the amplitude of said provided scanning waveform.

3. The combination of claim 1 for use in a television receiver of the type including a video output amplifier and a brightness limiter circuit within said brightness control means for regulating the average illumination of a reproduced televised image and in which the direct current component of said output amplifier signal exhibits said tendency to undesirably vary said average image illumination in the presence of said power line variation, wherein said third means couples said second control signal to said limiter circuit to vary an operating bias on said video output amplifier and offset the attempt of said direct current component to vary the average illumination of said reproduced image.

4. The combination of claim 1 wherein said first means includes rectifier and capacitive means responsive to said applied power line voltages to provide direct control signal voltages whose magnitudes are representative of said line voltage changes.

5. The combination of claim 4 wherein said first means also includes voltage divider means coupling said applied line voltages to said rectifier and capacitive means, and wherein said divider means includes a non-linear device exhibiting a resistance which decreases with increases in applied line voltage.

6. The combination of claim 5 wherein said first means includes a voltage dependent resistor serially coupled between a point of applied line voltage and a point of reference potential by a semiconductor rectifier and a capacitor, wherein the junction between said rectifier and said voltage dependent resistor is coupled to said reference potential point by a further included resistor, and wherein said first and second control signals are developed at the junction of said rectifier and said capacitor in the presence of line voltage variations.

* * * * *